US012568537B2

(12) United States Patent
David et al.

(10) Patent No.: US 12,568,537 B2
(45) Date of Patent: Mar. 3, 2026

(54) WIRELESS UPLINK COMMUNICATION SYSTEM

(71) Applicant: Microsoft Technology Licensing, LLC, Redmond, WA (US)

(72) Inventors: Nir David, Tel Aviv (IL); Arie Yehuda Gur, Kiryat Ono (IL); Anton Gorbanev, Kiryat Ono (IL); Oren Istrin, Tel Aviv (IL); Assaf Bar Ness, Ness Ziona (IL); Roei Halokhem, Herzliya (IL); Vadim Mishalov, Tel Aviv (IL); Uri Ron, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 17/808,504

(22) Filed: Jun. 23, 2022

(65) Prior Publication Data

US 2023/0422322 A1 Dec. 28, 2023

(51) Int. Cl.
*H04W 76/14* (2018.01)
*H04W 72/12* (2023.01)
*H04W 72/1263* (2023.01)

(52) U.S. Cl.
CPC ....... *H04W 76/14* (2018.02); *H04W 72/1221* (2013.01); *H04W 72/1263* (2013.01)

(58) Field of Classification Search
CPC ...... G06F 8/65; G06F 3/0441; G06F 3/04162; G06F 3/0383; G06F 3/03545
See application file for complete search history.

(56) References Cited

U.S. PATENT DOCUMENTS 9,569,041 B2 2/2017 Son
10,474,277 B2 11/2019 Pant et al.
(Continued)

FOREIGN PATENT DOCUMENTS

CN 104991795 * 10/2015
CN 104991795 A * 10/2015 .............. G06F 8/65
(Continued)

OTHER PUBLICATIONS

Notice of Allowance mailed on Dec. 14, 2023, in U.S. Appl. No. 18/066,466, 02 pages.
(Continued)

*Primary Examiner* — Derrick W Ferris
*Assistant Examiner* — Won Jun Choi
(74) *Attorney, Agent, or Firm* — Holzer Patel Drennan

(57) ABSTRACT

The disclosed technology provides wireless uplink transmission from a computing device to a peripheral device by communicating over a wireless connection between a digitizer of the computing device and the peripheral device by a multiuse communication protocol in which the digitizer receives input from the peripheral input device to affect operation of the computing device, transitioning communication from the multiuse communication protocol to a dedicated uplink communication protocol in which communication between with the peripheral input device includes transmission of multiple consecutive uplink blocks before the digitizer accepts downlink communications from the peripheral input device, and transmitting, while using the dedicated uplink communication protocol, consecutive data uplink blocks representing an upload to the peripheral input device before the digitizer accepts downlink communications from the peripheral input device.

19 Claims, 6 Drawing Sheets

(56) References Cited

U.S. PATENT DOCUMENTS

| | | | |
|---|---|---|---|
| 10,990,269 | B2 | 4/2021 | Nomi et al. |
| 11,048,360 | B2 | 6/2021 | Jang et al. |
| 11,204,655 | B2 | 12/2021 | Gur et al. |
| 11,269,428 | B2 | 3/2022 | Geller et al. |
| 2009/0260900 | A1 | 10/2009 | Ure |
| 2016/0006483 | A1 | 1/2016 | Nishi |
| 2016/0195941 | A1* | 7/2016 | Gur ..................... G06F 3/04162 |
| | | | 345/173 |
| 2016/0291956 | A1* | 10/2016 | Hargreaves .......... G06F 3/0383 |
| 2017/0235560 | A1* | 8/2017 | McLean ............. G06F 3/03545 |
| | | | 717/168 |
| 2018/0046269 | A1 | 2/2018 | Kaplan |
| 2018/0129340 | A1 | 5/2018 | Westhues et al. |
| 2018/0246587 | A1 | 8/2018 | Dekel |
| 2019/0064941 | A1 | 2/2019 | Westhues et al. |
| 2019/0102021 | A1 | 4/2019 | Jang et al. |
| 2020/0019255 | A1* | 1/2020 | Gilbert ................. H04L 63/123 |
| 2020/0073528 | A1 | 3/2020 | Nomi et al. |
| 2020/0081516 | A1 | 3/2020 | Zyskind et al. |
| 2020/0081560 | A1* | 3/2020 | Geller .................. G06F 1/3259 |
| 2023/0418396 | A1 | 12/2023 | David et al. |

FOREIGN PATENT DOCUMENTS

| | | | |
|---|---|---|---|
| CN | 109284018 A | 1/2019 | |
| EP | 2650758 A1 | 10/2013 | |
| WO | WO-2018214775 A1 * | 11/2018 | .............. G06F 8/65 |
| WO | 2020209534 A1 | 10/2020 | |
| WO | 2021067308 A1 | 4/2021 | |

OTHER PUBLICATIONS

Notice of Allowance mailed on Nov. 27, 2023, in U.S. Appl. No. 18/066,466, 7 pages.

"Non Final Office Action Issued In U.S. Appl. No. 18/066,466", Mailed Date: Aug. 7, 2023, 12 Pages.

"International Search Report and Written Opinion Issued in PCT Application No. PCT/US23/021609", Mailed Date: Sep. 4, 2023, 11 Pages.

"International Search Report and Written Opinion Issued in PCT Application No. PCT/US23/021611", Mailed Date: Aug. 18, 2023, 13 Pages.

Hobbs, Por Jordan, "Microsoft's New Patent Exposure: Expected to Launch a Multi-Function Surface Pen", Retrieved from: https://mx.gearbest.com/blog/new-gear/microsofts-new-patent-exposure-expected-to-launch-a-multi-function-surface-pen-5408, May 30, 2019, 3 Pages.

* cited by examiner

200

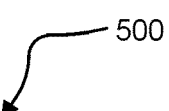

500

Communicate over a wireless connection between a digitizer of the computing device and the peripheral input device by a multiuse communication protocol
502

Transition communication by the digitizer over the wireless connection from the multiuse communication protocol to a dedicated uplink communication protocol before the digitizer accepts downlink communications from the peripheral input device
504

Transmit, while communicating by the dedicated uplink communication protocol, multiple consecutive data uplink blocks representing a cumulative upload from the digitizer to the peripheral input device before the digitizer accepts downlink communications from the peripheral input device
506

FIG. 5

WIRELESS UPLINK COMMUNICATION SYSTEM

BACKGROUND

User input devices such as styluses can be communicatively coupled with computing devices such as laptops. One communication method can be via electrostatic and/or electromagnetic communications between a transmitter of a user input device and a digitizer of a computing device. Such a connection can be used to exchange small amounts of data and facilitate ordinary use of the user input device with the computing device.

SUMMARY

The disclosed technology provides wireless uplink transmission from a computing device to a peripheral device by communicating over a wireless connection between a digitizer of the computing device and the peripheral device by a multiuse communication protocol in which the digitizer receives input from the peripheral input device to affect operation of the computing device, transitioning communication from the multiuse communication protocol to a dedicated uplink communication protocol in which communication between with the peripheral input device includes transmission of multiple consecutive uplink blocks before the digitizer accepts downlink communications from the peripheral input device, and transmitting, while using the dedicated uplink communication protocol, consecutive data uplink blocks representing an upload to the peripheral input device before the digitizer accepts downlink communications from the peripheral input device.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 5 illustrates example operations for wireless uplink transmission from a computing device to a peripheral input device.

DETAILED DESCRIPTIONS

Figure 1:
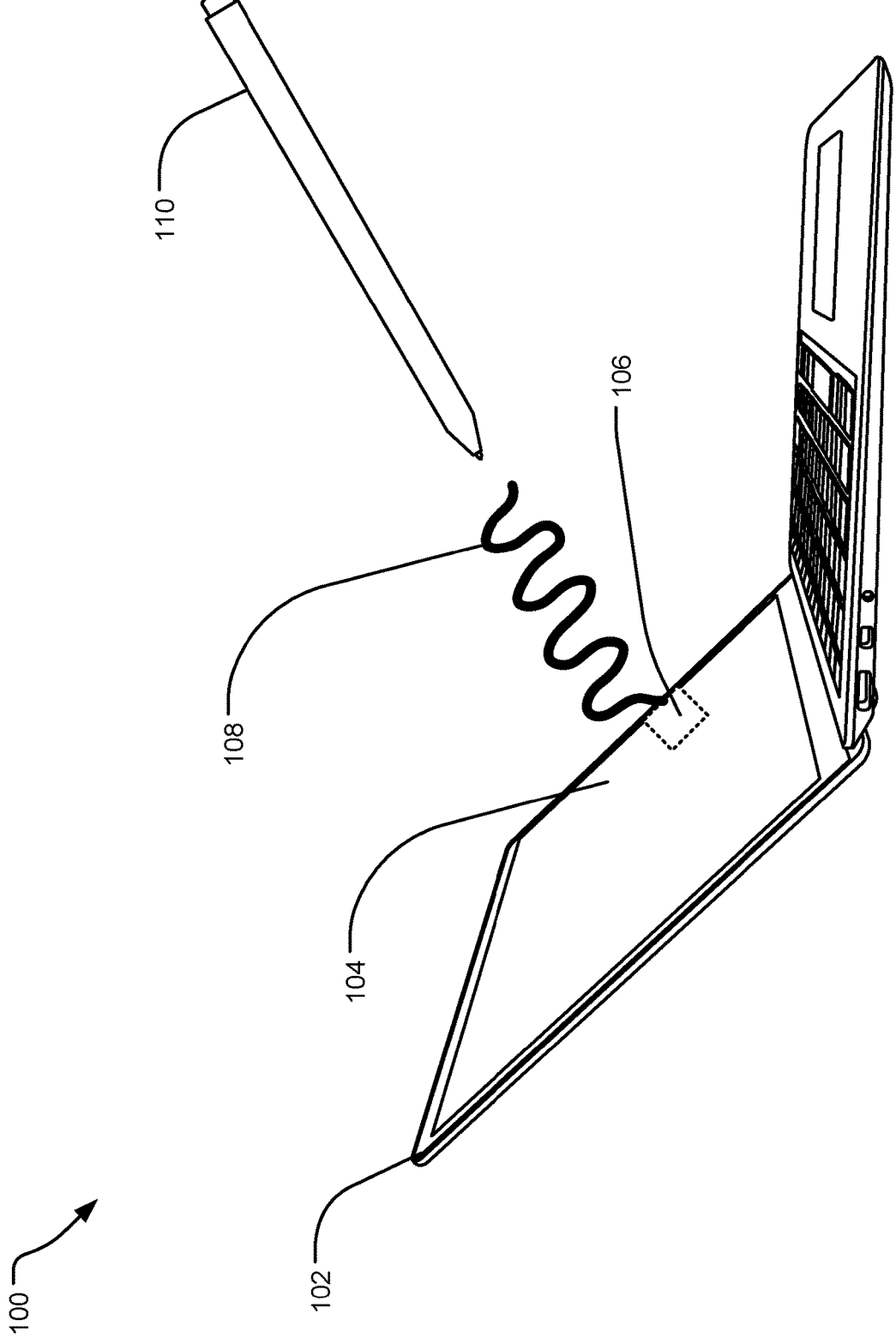
FIG. 1 illustrates an example system for wireless uplink transmission from a computing device to a peripheral input device.

Peripheral input devices, such as styluses, can communicate with computing devices using different wireless communication means. For example, when large updates are transmitted from a computing device to a communicatively coupled peripheral input device, the large data loads may be communicated through higher bandwidth channels, such as Bluetooth. The smaller communications for transmission of input (e.g., user input) from the peripheral input device can be communicated via lower bandwidth channels such as electrostatic or electromagnetic communications via digitizer hardware (e.g., of a display or of a trackpad) of the computing device. The higher bandwidth communications may require that the peripheral input device include dedicated hardware (e.g., Bluetooth or wireless USB interface hardware) that increases the expense of the peripheral user device.

While some larger updates can be transmitted intermittently between other multiuse commands via the lower bandwidth channels, the larger updates are hindered or even prevented by the lack of time in a communication cycle allocated to uplink blocks for uploading the large update. When communications are conducted over the lower bandwidth channels, the communications may be conducted using a multiuse communication protocol.

In the multiuse communication protocol, the digitizer may be configured to exchange information over the wireless connection to receive input from the peripheral input device to affect the operation of the computing device. For example, the peripheral input device may include a stylus for inking on a display of the computing device. In this example, the multiuse communication protocol may reserve portions of a communication cycle specifically for the use of the stylus. The synchronization and communication of these functions can occupy a significant portion of a communication cycle, leaving limited uplink blocks for uplinking data for an upload to the stylus. Also, because of the limited distance over which electrostatic or electromagnetic communication can be conducted from the digitizer, users may only place the user input device in sufficiently close proximity to the computing device for communication when the user is actively using the stylus, which may require that any communication be conducted using the multiuse communication protocol for seamless user operation. While uploads conducted using the multiuse communication protocol may ensure seamless operation of the user input device while any upload to the user input device occurs, the small portion of the low bandwidth connection allocated by the multiuse communication protocol to uplink blocks for the upload may cause unreasonable delays in the upload or prevent the upload from completing.

The presently disclosed technology transitions the communication protocols between a multiuse communication protocol and a dedicated uplink communication protocol for communications between the digitizer of the computing device and the peripheral input device. The dedicated uplink communication protocol differs from the multiuse communication protocol in that communication between the computing device and the peripheral input device using the dedicated uplink communication protocol is dedicated to uploading data in multiple consecutive uplink blocks from the digitizer to the peripheral input device. By eliminating or limiting the communication of input from the peripheral input device in a communication cycle, the electrostatic or electromagnetic communication from the digitizer can be dedicated to the upload of data from the computing device to the peripheral input device. The dedication of the digitizer to the upload of data can expedite and help to ensure the completion of the upload.

In implementations, the wireless communications may continue to be conducted using the dedicated uplink communication protocol until an upload completion condition is satisfied. Satisfaction of the upload completion condition may be based at least in part on whether the peripheral input device has confirmed that an upload has been completed. In implementations, while the communications are conducted using the dedicated uplink communication protocol, the digitizer may continuously or periodically transmit a signal indicating that the communications are being conducted by the dedicated uplink protocol. When the upload completion condition is satisfied, the digitizer may one or more of terminate the signal indicating that the communications are being conducted by the dedicated uplink protocol, generate a signal indicating that communications are being transitioned to using the multiuse communication protocol, and transition from using the dedicated uplink communication protocol to using the multiuse communication protocol.

In implementations, when the communications are being conducted using the dedicated uplink protocol, the digitizer may be configured to multicast the uplink data to more than one user input device. Unlike communications by larger bandwidth communication protocols (e.g., Bluetooth and wireless USB), which are tethered to specific user input devices, the communications using the dedicated uplink protocol can simultaneously provide the upload data to multiple devices via the electrostatic or electromagnetic communications from the computing device.

FIG. 1 illustrates an example system 100 for wireless uplink transmission from a computing device 102 to a peripheral input device 110. In the illustrated implementation, the peripheral input device 110 is a stylus that communicates with a digitizer 106 in a display 104 of the computing device 102 using one or more of electrostatic communication 108 and electromagnetic communication. Other implementations of the peripheral input device 110 include a remote studio dial, a dialer, a keyboard, or a mouse.

The digitizer 106 may communicate with the peripheral input device 110 in order to receive input from the peripheral input device 110 to affect the operation of the computing device 102. For example, the peripheral input device 110 may be manipulated by a user to touch the display 104 and communicate a user's intent to ink on the display 104.

During regular operation, the digitizer 106 may communicate with the peripheral input device 110 using a multiuse communication protocol. Because the electrostatic or electromagnetic communication via a digitizer interface offers limited bandwidth for transfers of data that do not represent operations for active use of the peripheral input device 110 with the computing device 102. For example, in implementations in which the peripheral input device 110 is a stylus, when using multiuse communication protocols, a communication cycle over which updated communications are exchanged between the peripheral input device 110 and the computing device 102 may be largely dedicated to locating the stylus relative to the display 104 and inking when the stylus is at a close enough proximity to the display 104 and/or if sufficient pressure is applied to the stylus. The communication cycle may be dominated by downlink and uplink blocks that may be conducted periodically and/or synchronously specifically for the active use of the stylus. This may leave few uplink blocks, if any, in a communication cycle to dedicate to uploading data in multiple consecutive uplink blocks.

In the presently disclosed technology, the digitizer 106 is configured to transition between a multiuse communication protocol in which the digitizer is configured to receive user input from the peripheral input device to affect the operation of the computing device (e.g., inking by the peripheral input device 110 on the display 104) to a dedicated uplink communication protocol in which communication between the computing device 102 and the peripheral input device 110 includes the transmission of multiple consecutive uplink blocks from the digitizer 106 to the peripheral input device 110 before the digitizer 106 accepts downlink communications from the peripheral input device 110. The downlink communications may include data representing progress of the upload or may signal a completion of the upload. By eliminating or limiting communication of input from the peripheral input device 110 to affect the operation of the computing device 102 in a communication cycle, the electrostatic or electromagnetic communication from the digitizer 106 can be dedicated to the upload of data from the computing device 102 to the peripheral input device 110.

In implementations, the wireless communications may continue to be conducted using the dedicated uplink communication protocol until an upload completion condition is satisfied. Satisfaction of the upload completion condition may be based at least in part on whether the peripheral input device 110 has confirmed that an upload has been completed. In implementations, while the communications are conducted using the dedicated uplink communication protocol, the digitizer 106 may continuously or periodically transmit a signal indicating that the communications are being conducted by the dedicated uplink communication protocol. When the upload completion condition is satisfied, the digitizer 106 may one or more of terminate the signal indicating that the communications are being conducted by the dedicated uplink protocol, generate a signal indicating that communications are being transitioned to using the multiuse communication protocol, and revert from using the dedicated uplink communication protocol to using the multiuse communication protocol.

In implementations, when the communications are being conducted using the dedicated uplink protocol, the computing device 102 may be configured to multicast the uplink data to more than one peripheral input device (e.g., including the peripheral input device 110). Unlike communications by larger bandwidth communication protocols (e.g., Bluetooth and wireless USB), which are tethered by each channel to a specific peripheral input device, the communications using the dedicated uplink protocol can simultaneously provide the update data to multiple peripheral input devices 110 via the electrostatic or electromagnetic communications from the digitizer 106. In implementations in which the dedicated uplink protocol provides data to multiple peripheral input devices 110, the computing device may be configured to track upload and/or update (e.g., firmware or software update) statuses of each of the peripheral input devices 110 that receive the upload and/or update.

In an implementation, the digitizer 106 is a type of touch sensor. For example, the digitizer may include a mesh of electrical traces or antennas formed within the structure of the touchscreen interface of the display 104. In resistive touchscreen technologies, the touch sensor or digitizer 106 is composed of the contact traces on the glass substrate that are connected to the upper conductive polyester layer under pressure. In capacitive touchscreen technologies, the touch sensor or digitizer 106 is composed of the conductive traces on the opposing surfaces forming the capacitive touch interface. In NFI touchscreen technologies, the touch sensor or digitizer 106 is composed of the conductive antenna traces. For the purposes of this disclosure, hereinafter, reference to a digitizer 106 is intended to include reference to the conductive traces in any of these touch sensor technologies, which may generate generally consistent electric fields across the surface of the corresponding touchscreen interface. In implementations, communication via the digitizer may include electrostatic or electromagnetic communication facilitated by detection or generation of changes in electric and/or magnetic fields generated by the digitizer 106 and/or the peripheral input device 110. The changes in electric and/or magnetic fields may be measured and recognized as signals from an active stylus or another peripheral input device 110.

In implementations, the digitizer 106 may be composed of a transparent protective cover layer as a top surface of a touchscreen interface (e.g., of the display 104) that is adhered to a transparent flexible substrate. An array of upper antenna traces may be formed on the bottom surface of the flexible substrate. The upper antenna traces may be made of a conductive transparent material, e.g., indium tin oxide, printed on the flexible substrate. The upper antenna traces may generally be parallel to each other and may be electrically coupled to one or more conductive plates along one or more edges of the touchscreen interface. Subsets of the upper antenna traces may be grouped into several different antenna sections, each electrically connected to a separate conductive plate along the edge of the touchscreen interface. An electrically insulating layer may be positioned beneath the upper antenna traces on the bottom surface of the flexible substrate. A glass layer may be positioned beneath the electrically insulating layer. An array of lower antenna traces may be formed on the top surface of the glass layer. The lower antenna traces may be made of a conductive transparent material, e.g., indium tin oxide, printed on the top surface of the glass layer. In an alternative embodiment, the lower antenna traces may be printed on a second transparent flexible substrate adhered to the top surface of the glass layer. The lower antenna traces may generally be parallel to each other and may be electrically coupled to one or more conductive plates along one or more edges of the touchscreen interface. The lower antenna traces may be oriented perpendicular to the direction of the upper antenna traces. Subsets of the lower antenna traces may be grouped into a number of different antenna sections, each corresponding to an opposing antenna section in the array of upper antenna traces. Each subset of the lower antenna traces may be electrically connected to a separate conductive plate along the edge of the touchscreen interface.

When the peripheral input device 110 approaches or touches the display 104, interference with an electric field generated by the capacitive interaction between the upper and lower antenna traces alters the voltage in the touch location. This voltage change in the touch location can be measured and localized by the perpendicular grid arrangement of the upper and lower antenna traces. Additional determinations such as hover height (i.e., when the peripheral input device 110 is slightly above, but not touching, the display 104) and inking (i.e., when the peripheral input device 110 is in contact with the display 104) can be made by processing software and circuitry depending upon the significance of a change in the electric and/or magnetic field detected by the digitizer 106.

In implementations, the computing device 102 display generator for generating an image on the display 104 may be positioned beneath the glass layer. The display generator may be composed of a large array of pixels supported on a pixel substrate, e.g., an integrated circuit board providing addressable electronic connections to each of the pixels for control of the pixels. Each pixel may be composed of several photo emitting elements, for example, red/green/blue light emitters, that generate the display images, and a photo receiving element for receiving light input for other data and control purposes. As noted, each of the layers above the glass layer is transparent. Thus, the light forming the images generated by the pixels by the display generator passes through the digitizer 106, and thus the display images of the touchscreen interface are visible on the display 104. Several display and touchscreen processing components (e.g., processors, memory with software instructions, and/or circuits) may be positioned below the display generator and may be communicatively coupled to the display generator and the digitizer 106 to provide control of and send data to and receive data from each.

In implementations, the digitizer 106 may be configured to additionally or alternatively exchange data with the peripheral input device 110 other than data representing position and/or pressure applied by or to the peripheral input device 110. For example, the electrostatic or electromagnetic data transmitted between the digitizer 106 can include one or more of, without limitation, data representing statuses of one or more of the digitizer 106 and the peripheral input device 110, data representing peripheral input (e.g., user input) provided by the peripheral input device 110 to the digitizer 106, data to be uploaded (e.g., a firmware update, copy/paste data, or any other data) to the peripheral input device 110 from the digitizer 106, data representing confirmations of data transfer, and data (e.g., a signal) representing a communication protocol (e.g., a multiuse communication protocol or a dedicated uplink communication protocol) by which the digitizer 106 communicates.

Figure 2:
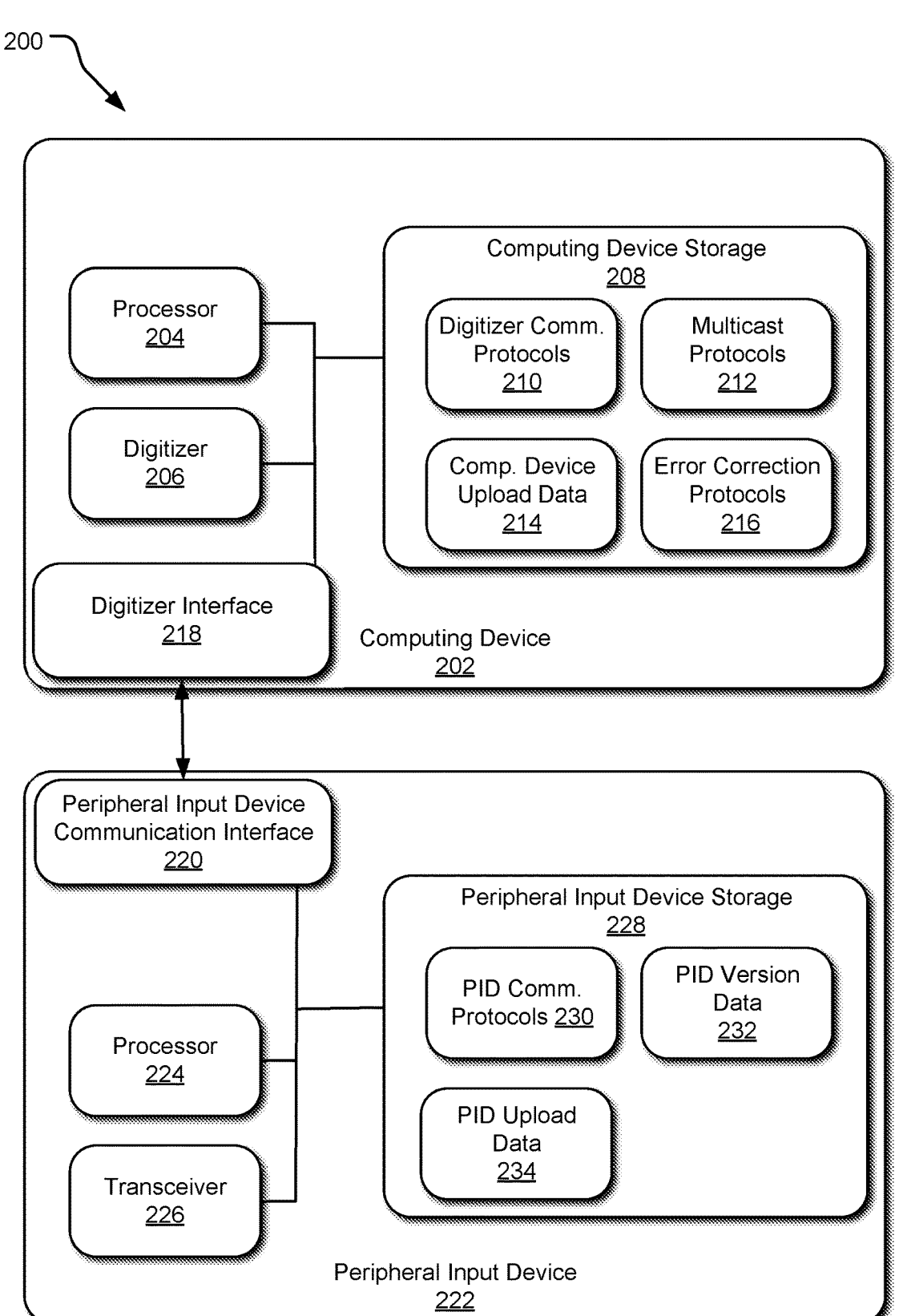
FIG. 2 illustrates an example electronics system for wireless uplink transmission from a computing device to a peripheral input device.

FIG. 2 illustrates an example electronics system 200 for wireless uplink transmission from a computing device 202 to a peripheral input device 222. In the illustrated implementation, the computing device 202 includes a processor 204, a computing device storage 208, and a digitizer 206. The digitizer 206 communicates with a peripheral input device communication interface 220 of the peripheral input device 222 via a digitizer interface 218. The digitizer interface 218 may be positioned at a display or a trackpad of the computing device 202 to interact with the peripheral input device communication interface 220 of the peripheral input device 222 using electrostatic or electromagnetic communications.

The computing device storage 208 of the computing device 202 may include one or more of digitizer communication protocols 210, multicast protocols 212, computing device upload data 214, and error correction protocols 216. The digitizer communication protocols 210 are protocols the digitizer 206 executes to communicate with the peripheral input device 222 (e.g., one or more of a multiuse communication protocol and a dedicated uplink protocol). The digitizer communication protocols 210 may further dynamically or statically control uplink window and/or data upload unit sizes (e.g., based at least in part on predefined relationships) in order to ensure that the data is transmitted quickly and without error. Smaller windows or data upload unit sizes may decrease the likelihood of error but increase the transfer time (e.g., due to more error checks overall for each smaller unit).

In implementations, the digitizer communication protocols include triggers for transitioning between communication protocols. For example, the digitizer communication protocols 210 may be configured to determine if an upload is available for the peripheral input device 222 and may determine to transition between a multiuse communication protocol to a dedicated uplink communication protocol to facilitate the upload. In implementations, the digitizer communication protocols 210 may be configured to first determine whether an upload is appropriate based on whether the upload is acceptable by the peripheral input device 222 before transitioning or may transition regardless of a determination of upload acceptability. The determination of whether the upload is acceptable by the peripheral input device 222 may be based on one or more of whether the upload represents a version of software or firmware relative to a version of the firmware or software stored on the peripheral input device 222, whether the peripheral input device 222 has sufficient storage to receive the upload, and whether the peripheral input device 222 already has the same data stored (e.g., already copied data in a copy-and-paste operation). The digitizer communication protocols 210 may also be configured to revert back from the dedicated uplink communication protocol to the multiuse communication protocol. The reversion may be based at least in part on a determination that an upload completion condition is satisfied or based at least in part on a determination by the digitizer 206 and the peripheral input device that the upload is unacceptable.

Multicast protocols 212 may include data for multicasting. The data may be configured to track the progress of uploads via uplink blocks simultaneously to more than one peripheral input device 222. This data may include the ability to track identifiers of the peripheral input devices 222 and associate stored data in the computing device storage 208 with each of the peripheral input devices 222 via the identifiers. The associated stored data may include statuses of the peripheral input devices 222, whether an upload is being or was conducted or failed, position data of a peripheral input device 222, and localized display data to indicate a status of a peripheral input device 222 in a user interface at a location proximate to the peripheral input device 222 (e.g., in a grid in which each element of the grid is proximate a different peripheral input device 222 and indicates a status of the proximal peripheral input device).

The computing device upload data 214 is data that is stored on the computing device 202 for upload by the digitizer 206 during uplink windows to update peripheral input device upload data 234. In implementations, one or more of the computing device upload data 214 and the peripheral input device upload data 234 may include one or more of, without limitation, a firmware update, a copied image, and a copied text string.

The error correction protocols 216 are protocols for correcting errors in data exchanged between the digitizer 206 and the peripheral input device 222. The error correction protocols 216 may include protocols for ensuring the fidelity of the exchanged data, such as, without limitation, Reed-Solomon codes, Polar codes, checksums, or cyclic redundancy checks. In implementations, the error correction protocols 216 or complementary elements thereto are also stored in peripheral input device storage 228.

While the computing device storage 208 is illustrated as an element separate of the digitizer 206, implementations are contemplated in which the elements stored in the computing device storage 208 are stored in local firmware storage of the digitizer 206. Also, although illustrated separately, the digitizer interface 218 may be an integral element of the digitizer 206. Further, the operations of the digitizer 206 may be controlled by one or more of the processor 204 available generally to components of the computing device 202 and a processor that is integrated into or otherwise dedicated to the operation of the digitizer 206 and/or various components that facilitate operations of the digitizer 206.

In the illustrated implementation, the peripheral input device 222 is an active peripheral input device that is provided power to operate. The peripheral input device includes a processor 224 and a transceiver 226 for receiving data from the digitizer 206 via the peripheral input device communication interface 220. The peripheral input device 222 further includes the peripheral input device storage 228. In implementations, the peripheral input device storage 228 includes one or more of peripheral input device communication protocols 230, peripheral input device version data 232, and peripheral input device upload data 234.

The peripheral input device communication protocols 230 include data for executing a communication protocol (e.g., one of a multiuse communication protocol and a dedicated uplink communication protocol) on the peripheral input device 222. Implementations are contemplated in which the control over communication between the digitizer 206 and the peripheral input device 222 is distributed between or controlled by the digitizer 206 and the peripheral input device 222. Depending on the distribution of control, the peripheral input device communication protocols 230 and the digitizer communication protocols 210 may conduct some communication operations, such as establishing the connections, determining which communication protocol to enter, determining when to transition to a different communication protocol, and determining when an upload is complete (e.g., satisfies an upload completion condition). An upload completion condition is a condition the satisfaction of which indicates that an upload is complete. The upload completion condition may indicate one or more of that data has been completely transmitted, that data has been completely received, that a data update based at least in part on the uploaded data has been completed, a confirmation or other indication that a data upload has been completed, and a confirmation that a firmware update of the peripheral input device 222 has been completed.

The peripheral input device version data 232 includes version data of software and/or firmware of the peripheral input device 222. The peripheral input device version data 232 can indicate whether the peripheral input device 222 should receive an upload from the digitizer 206. For example, if the upload data represents a software or firmware update and the version of the software or firmware in the peripheral input device version data 232 indicates that the peripheral input device 222 already has the version to be uploaded or a newer version, the peripheral input device may determine to refuse the upload from the digitizer 206. Another example is a copy-and-paste operation. If the peripheral input device 222 already has stored an image to be uploaded in a copy operation, the peripheral input device 222 may reject the upload of the redundant data. Further, if the upload size exceeds the available storage in the peripheral input device 222, the peripheral input device 222 may decline the upload. In another implementation, a dedicated uplink protocol communication can be used to upload data from the computing device 202 to the peripheral input device 222 and to another computing device (not illustrated). This may allow the pen to be used as a communicative intermediary between the computing device 202 and the other computing device.

The peripheral input device upload data 234 is data uploaded from the digitizer 206. The peripheral input device upload data 234 may include copied data (e.g., for pasting), a software update, or a firmware update. The peripheral input device upload data 234 may have been stored in the computing device upload data 214 prior to an upload of the data by the digitizer 206.

Figure 3:
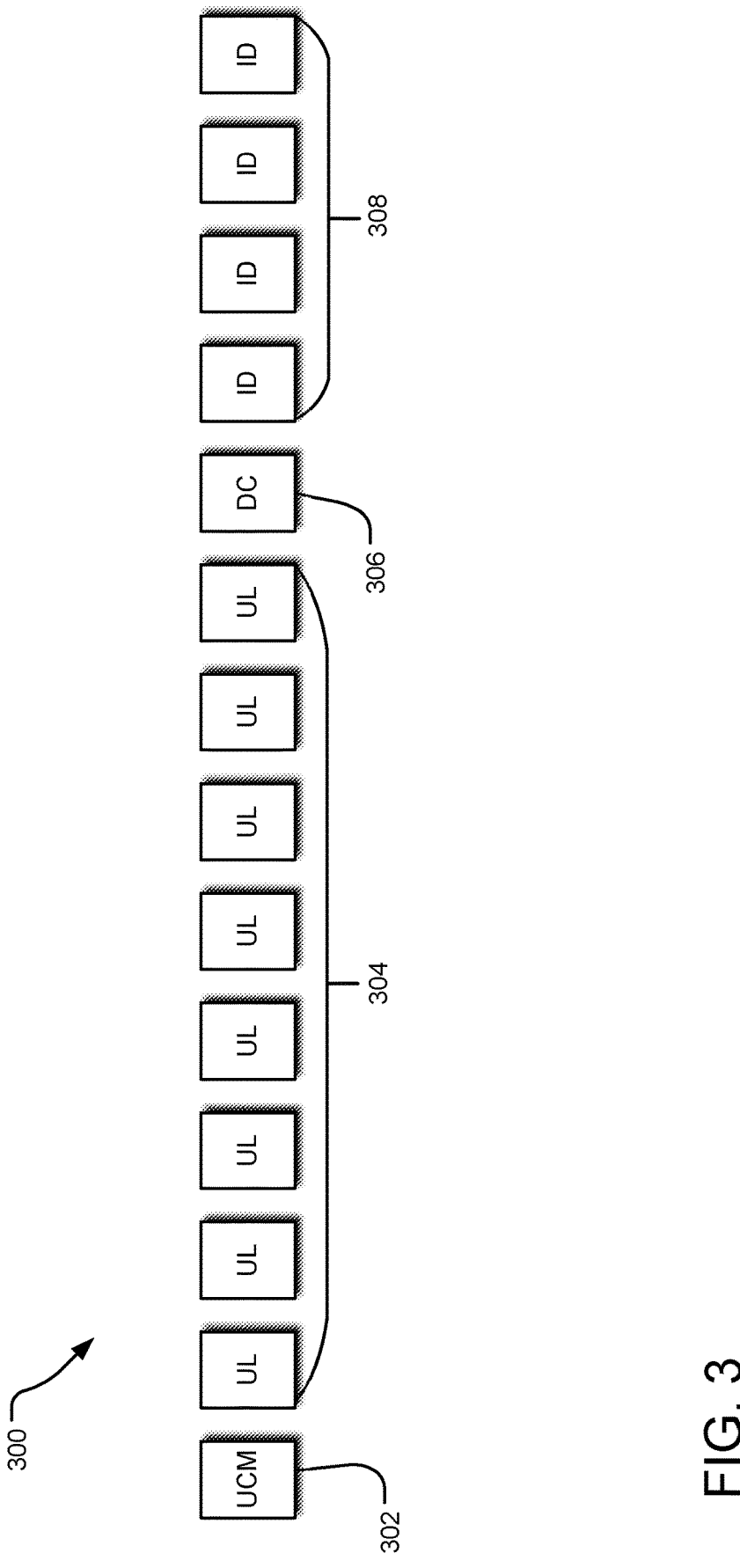
FIG. 3 illustrates an example communication cycle for a communication between a digitizer and a peripheral input device using a dedicated uplink protocol.

FIG. 3 illustrates an example communication cycle 300 for a communication between a digitizer and a peripheral input device using a dedicated uplink protocol. The communication cycle 300 includes an uplink communication mode block 302 that indicates to the peripheral input device that the communication protocol will be, is being, or has been transitioned to a dedicated uplink communication protocol. In implementations, this signal block may be continuously or periodically transmitted until an upload is finished (and a reversion to the multiuse communication protocol is appropriate). The dedicated uplink communication protocol is designed to facilitate faster uploads from the digitizer to the peripheral input device by providing a predetermined minimum number of consecutive uplink blocks 304 in a communication cycle before the digitizer accepts downlink communications from the peripheral input device. The dedicated uplink communication protocol is presented in contrast to a multiuse communication protocol by which the peripheral input device provides input to the digitizer to affect the operation of the computing device of which the digitizer is a component or to which the digitizer is otherwise communicatively coupled. The communication cycle further includes a downlink confirmation block 306 that confirms the data from the consecutive uplink blocks 304 has been uploaded (e.g., in satisfaction of an upload completion condition). After the downlink confirmation block 306 data has been received by the digitizer in a downlink, the communication protocol may be reverted back to a multiuse communication protocol. Input data blocks 308 represent portions of a communication cycle during which the digitizer searches for touch and does not receive uplink data from the peripheral input devices.

Figure 4:
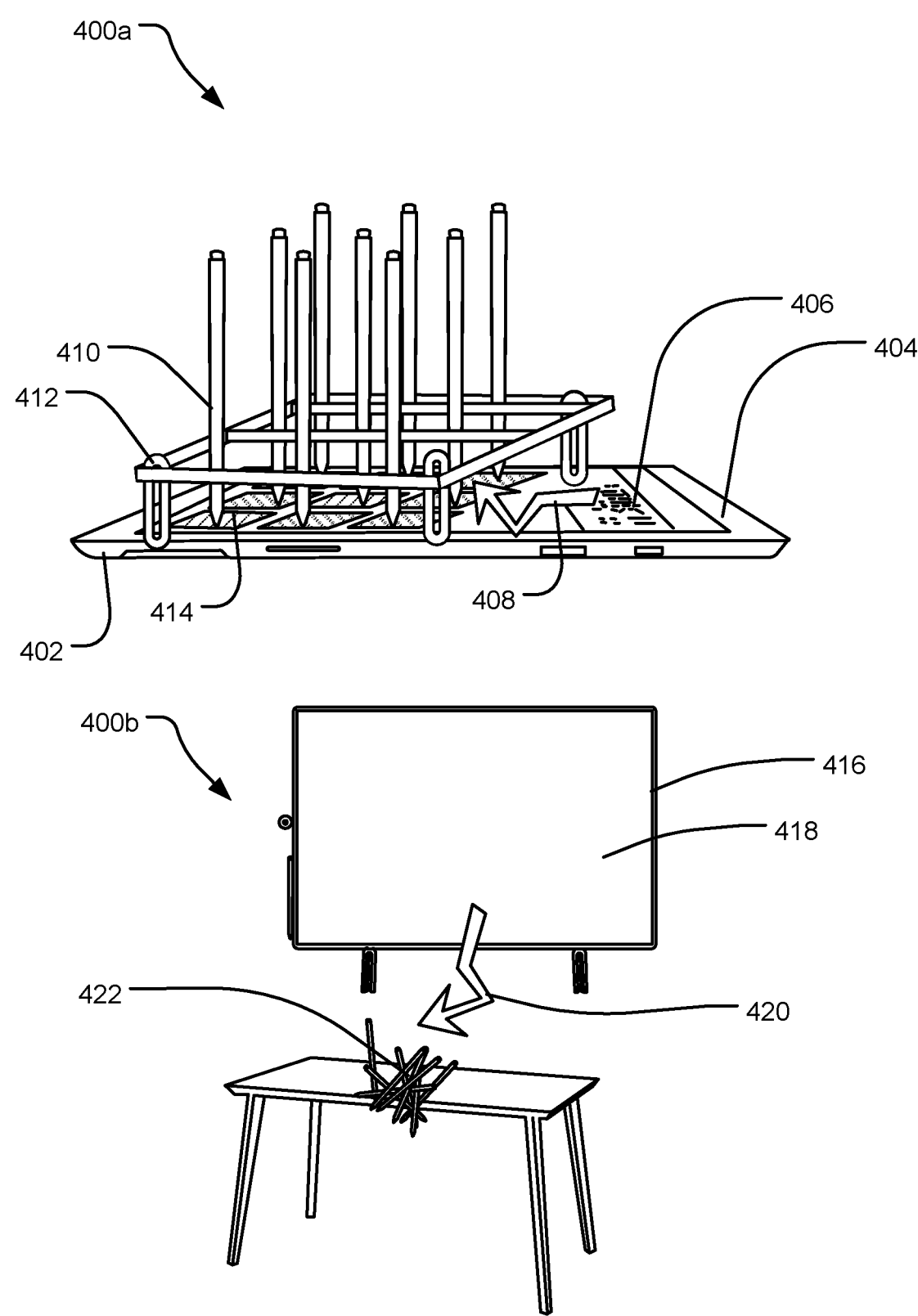
FIG. 4 illustrates example systems for multicasting uploads from a digitizer to multiple peripheral input devices.

FIG. 4 illustrates example systems 400a and 400b for multicasting uploads from a digitizer to multiple peripheral input devices 410 and 422. System 400a illustrates an implementation of a position-dependent multicasting configuration. In the position-dependent multicasting configuration, a user interface 406 of a first display 404 of a first computing device 402 has a position-dependent indicator 414 corresponding to a peripheral input device 410 most proximal to the position-dependent indicator 414. The digitizer (not illustrated) of the display 404 communicates via electrostatic or electromagnetic communication 408. In the illustrated implementation, the peripheral input device 410 is positioned in a frame 412 to maintain the proximity of the peripheral input device 410 to the position-dependent indicator 414 and facilitate local communication specifically with the peripheral input device 410. In the illustrated implementation, the pattern of the position-dependent indicator 414 indicates that an upload to or firmware or software update in the peripheral input device 410 satisfies an upload completion condition indicating that the data was successfully uploaded and/or installed.

The position-dependent indicator 414 can be indicative of other qualities of the peripheral input device 410, such as a current charge status of the peripheral input device 410, a status that the peripheral input device 410 has copied data for pasting, progress of an upload or update to the peripheral input device 410, random identifiers assigned or assignable to each peripheral input device 410, and/or a status that the peripheral input device is operating in a particular mode of operation (e.g., a style or color of inking). To facilitate the position-dependent indicator 414, a digitizer of the device 402 may determine location data and an associated identifier of the peripheral input device 410 to associate the position-dependent indicator 414 with the peripheral input device 410. The digitizer may receive data including one or more of peripheral input device version data, an upload confirmation (e.g., via a downlink confirmation block), a power status of the peripheral input device 410, an operating mode of the peripheral input device 410 (e.g., a color emitted by lights of or color or style of inking from a stylus), or peripheral input device upload data (e.g., copied data to be pasted to the same or a different display 404) from the peripheral input device 410. The received data may be used to update the position-dependent indicator 414.

The system 400b illustrates a proximity multicasting system that simultaneously casts upload data to any of a plurality of peripheral input devices 422 within a predefined proximity relative to a digitizer (not illustrated) sufficient to satisfy a proximity condition (e.g., within a threshold range or within a range of distances from the digitizer). The system 400b includes a second computing device 416 with a second display 418. The second display 418 includes a digitizer (not illustrated) that communicates via an electrostatic and/or electromagnetic multicasted communication 420. In implementations, the electrostatic and/or electromagnetic multicasted communication 420 provides upload data to all of the plurality of peripheral input devices 422 that satisfy the proximity condition and/or may do so without identifying any of the plurality of peripheral input devices 422. In these implementations, each of the plurality of peripheral input devices 422 may control whether an upload occurs and error handling (e.g., with error correction protocols stored in each of the plurality of peripheral input devices 422.

Unlike other communication means such as Bluetooth and wireless USB, the electrostatic or electromagnetic communication through a digitizer like the one of the computing device 402 can simultaneously communicate by multicast with any number of peripheral input devices that are within a predefined proximity. For technicians who are tasked with updating a large number of peripheral input devices 410, the multicasting could save significant time because peripheral input devices 410 could be updated simultaneously and with fewer limitations on the quantity of simultaneous uploads to the peripheral input devices 410 than by means of Bluetooth or wireless USB.

FIG. 5 illustrates example operations 500 for wireless uplink transmission from a computing device to a peripheral input device. A communicating operation 502 communicates over a wireless connection between a digitizer (e.g., an element of a display or trackpad) of the computing device and the peripheral input device (e.g., a stylus, studio dial, mouse, or keyboard) by a multiuse communication protocol in which the digitizer is configured to receive input from the peripheral input device to affect the operation of the computing device.

In an implementation, the peripheral input device communicates with a digitizer in a display of the computing device using one or more of electrostatic communication and electromagnetic communication. The digitizer may communicate with the peripheral input device in order to receive input from the peripheral input device to affect the operation of the computing device. For example, the peripheral input device may be manipulated by a user to touch the display and communicate a user's intent to ink on the display.

During regular operation, the digitizer may communicate with the peripheral input device using a multiuse communication protocol. Because the electrostatic or electromagnetic communication via a digitizer interface offers limited bandwidth for transfers of data that do not represent operations for active use of the peripheral input device with the computing device. For example, in implementations in which the peripheral input device is a stylus, when using multiuse communication protocols, a communication cycle over which updated communications are exchanged between the peripheral input device and the computing device may be largely dedicated to locating the stylus relative to the display and inking when the stylus is at a close enough proximity to the display and/or if sufficient pressure is applied to the stylus. The communication cycle may be dominated by downlink and uplink blocks that may be conducted periodically and/or synchronously specifically for the active use of the stylus. This may leave few uplink blocks, if any, in a communication cycle to dedicate to uploading data in multiple consecutive uplink blocks.

A transitioning operation 504 transitions communication by the digitizer over the wireless connection from the multiuse communication protocol to a dedicated uplink communication protocol in which communication between the computing device and the peripheral input device includes the transmission of multiple consecutive uplink blocks from the digitizer to the peripheral input device before the digitizer accepts downlink communications from the peripheral input device.

The digitizer and/or the peripheral input device is configured to transition between a multiuse communication protocol in which the digitizer is configured to receive user input from the peripheral input device to affect operation of the computing device (e.g., inking by the peripheral input device on the display) to a dedicated uplink communication protocol in which communication between the computing device and the peripheral input device includes the transmission of multiple consecutive uplink blocks to from the digitizer to the peripheral input device before the digitizer accepts downlink communications from the peripheral input device. By eliminating or limiting communication of input from the peripheral input device to affect the operation of the computing device in a communication cycle, the electrostatic or electromagnetic communication from the digitizer can be at least largely dedicated to the upload of data from the computing device to the peripheral input device.

In implementations, the transitioning operation 504 may be triggered by a determination by one or more of the digitizer, the peripheral input device, or a user that data be uploaded to the peripheral input device. In an implementation, the version information for software or firmware may be stored within the peripheral input device. One or more of the peripheral input device and the digitizer may determine that an update would benefit the operation of the peripheral input device. In implementations, the digitizer may issue a request to the peripheral input device to accept a data upload, and the peripheral input device may refuse the upload. Refusal of the upload may be based at least in part on one or more of the peripheral input device storage being too full to accept the upload, the peripheral input device determining that peripheral input device version data indicates that the upload reflects a version of software or firmware that is the same version or an older version of the software or firmware relative as the version stored in the peripheral input device version data. In another implementation, the software or firmware version data may be compared by the digitizer or a computing device to which the digitizer is communicatively coupled to determine whether the upload represents a new version of the software or firmware that should be uploaded to the peripheral input device.

A transmitting operation 506 transmits while communicating by the dedicated uplink communication protocol multiple consecutive data uplink blocks representing a cumulative upload from the digitizer to the peripheral input device before the digitizer accepts downlink communications from the peripheral input device. In implementations, the cumulative upload includes an update to firmware of the peripheral input device.

In implementations, the wireless communications may continue to provide upload data to the peripheral input device using the dedicated uplink communication protocol until an upload completion condition is satisfied. Satisfaction of the upload completion condition may be based at least in part on whether the peripheral input device has confirmed that an upload has been completed. The upload completion condition may indicate one or more of that data has been completely transmitted, that data has been completely received, that a data update based at least in part on the uploaded data has been completed, a confirmation or other indication that a data upload has been completed, and a confirmation that a firmware update of the peripheral input device has been completed.

In implementations, while the communications are conducted using the dedicated uplink communication protocol, the digitizer may continuously or periodically transmit a signal indicating that the communications are being conducted by the dedicated uplink communication protocol. The signal indicating communications are being conducted by the dedicated uplink communication protocol may allow the peripheral input device to maintain the dedicated uplink protocol for only as long as necessary and to allow the timely resumption of downlink communications for the use of the peripheral input device with the computing device. When the upload completion condition is satisfied, the digitizer may one or more of terminate the signal indicating that the communications are being conducted by the dedicated uplink protocol, generate a signal indicating that communications are being transitioned to using the multiuse communication protocol, and revert from using the dedicated uplink communication protocol to using the multiuse communication protocol. Reversion back to communicating by the multiuse communication protocol may save energy relative to communicating by the dedicated uplink communication protocol and may also allocate a greater portion of the communication cycle to downlinks for seamless use of the peripheral input device (e.g., a use that is not available in the dedicated uplink protocol).

In implementations, the electrostatic or electromagnetic data transmitted between the digitizer and the peripheral input device can include one or more of, without limitation, data representing a position or orientation peripheral input device relative to the digitizer, data representing pressure applied by or to the peripheral input device, data representing statuses of one or more of the digitizer and the peripheral input device, data representing peripheral input (e.g., user input) provided by the peripheral input device to the digitizer, data to be uploaded (e.g., a firmware update, copy/paste data, or any other data) to the peripheral input device from the digitizer, data representing confirmations of data transfer, and data (e.g., a signal) representing a communication protocol (e.g., a multiuse communication protocol or a dedicated uplink communication protocol) by which the digitizer communicates. In implementations, the digitizer transmits to the peripheral input device a signal indicating the dedicated uplink communication protocol is active, while communication is conducted by the dedicated uplink communication protocol.

In implementations, the transmitting operation 506 includes multicasting the multiple consecutive data uplink blocks to the peripheral input device and at least one other peripheral input device. The digitizer may be configured to multicast the uplink data to more than one peripheral input device. Unlike communications by larger bandwidth communication protocols (e.g., Bluetooth and wireless USB), which are tethered by each channel to a specific peripheral input device, the communications using the dedicated uplink protocol can simultaneously provide the update data to multiple peripheral input devices via the electrostatic or electromagnetic communications from the digitizer.

In implementations, the operations 500 further include a reverting operation (not illustrated) that reverts communication by the digitizer over the wireless connection from the dedicated uplink communication protocol to the multiuse communication protocol based at least in part on the satisfaction of an upload completion condition. In implementations, the upload completion condition is based at least in part on a confirmation by the peripheral input device that the cumulative upload is complete.

Figure 6:
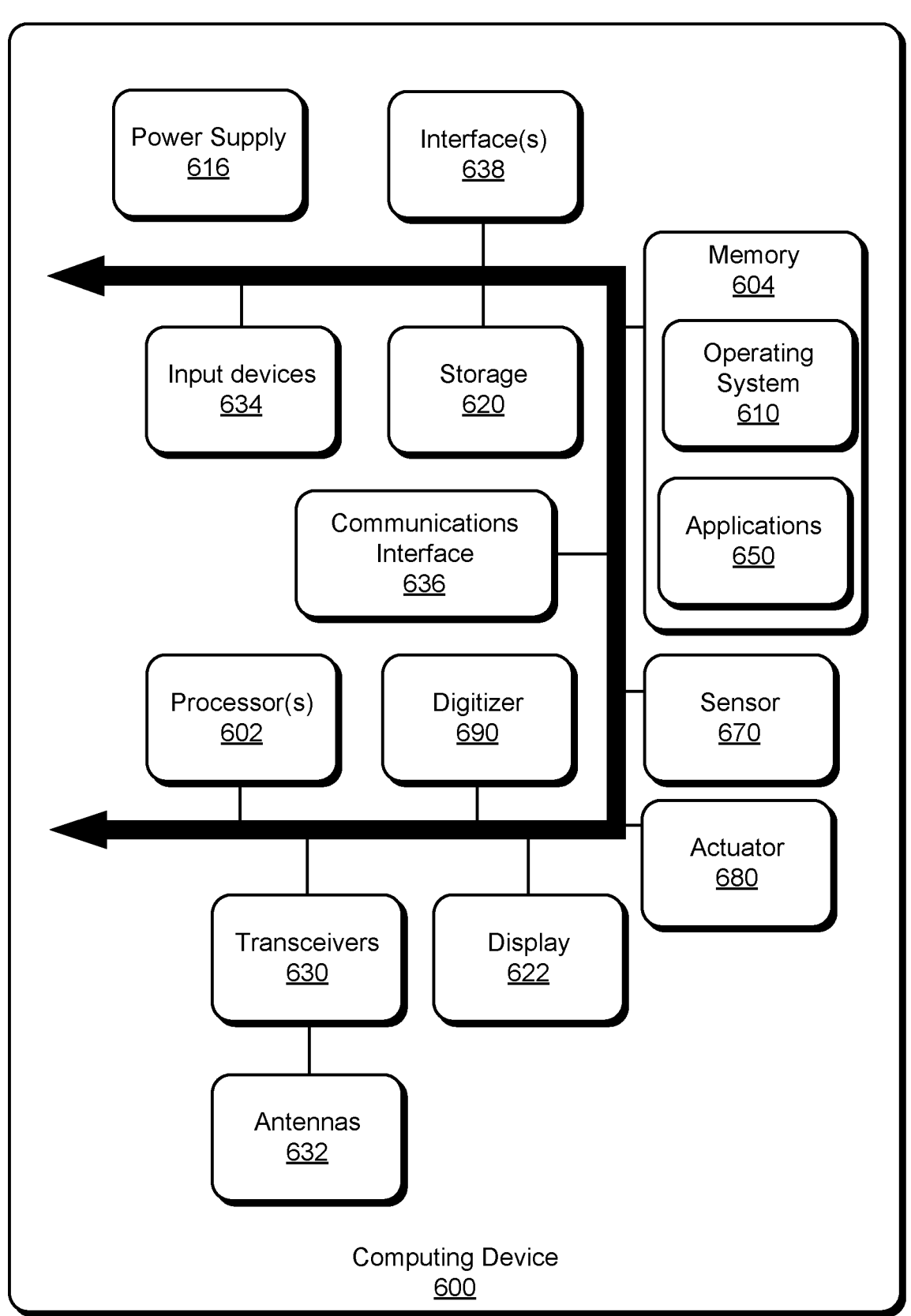
FIG. 6 illustrates an example computing device for implementing the features and operations of the described technology.

FIG. 6 illustrates an example computing device 600 for implementing the features and operations of the described technology. The computing device 600 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more processor(s) 602 and a memory 604. The memory 604 generally includes both volatile memory (e.g., RAM) and nonvolatile memory (e.g., flash memory). An operating system 610 resides in the memory 604 and is executed by the processor(s) 602.

In an example computing device 600, as shown in FIG. 6, one or more modules or segments, such as automated actuator protocols, applications 650, digitizer communication protocols, a multiuse communication protocol, a dedicated uplink communication protocol, multicast protocols, error correction protocols, peripheral input device communication protocols, peripheral input device version data, are loaded into the operating system 610 on the memory 604 and/or storage 620 and executed by processor(s) 602. The storage 620 may include one or more tangible storage media devices and may store computing device upload data, peripheral input device upload data, inking styles, inking colors, copy-and-paste copied data, copied strings, copied images, color or nature of emitted light from a peripheral input device, an identifier of a peripheral input device, a relative position of a peripheral input device relative to a display or trackpad, pressure data representing pressure applied by or to a peripheral interface device, uplink blocks, downlink blocks, a position-dependent indicator, an uplink communication mode block, a predetermined minimum number of consecutive uplink blocks, a downlink confirmation block, a communication cycle, an input data block, a communication cycle, an upload completion condition, a proximity condition, locally and globally unique identifiers, requests, responses, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a communications interface 636 (e.g., a network adapter), which is a type of computing device. The computing device 600 may use the communications interface 636 and any other types of computing devices for establishing connections over a wide-area network (WAN) or local-area network (LAN). It should be appreciated that the network connections shown are examples and that other computing devices and means for establishing a communications link between the computing device 600 and other devices may be used.

The computing device 600 may include one or more input devices 634 such that a user may enter commands and information (e.g., a keyboard or mouse). The one or more input devices 634 may be implementations of the peripheral input devices described herein and/or may be implementations of the computing device 600. These and other input devices may be coupled to the server by one or more interfaces 638, such as a serial port interface, parallel port, or universal serial bus (USB). The computing device 600 may further include a display 622, such as a touch screen display.

In implementations in which the computing device 600 includes or is an automated (e.g., robotic) device, the computing device 600 may include an actuator 680 adapted to engage elements of the apparatuses disclosed herein. The actuator 680 may be operable to perform operations disclosed herein (e.g., by executing by the processor(s) 602 automated actuator protocols stored in the storage 620 and/or the memory 604). The actuator 680 may be operated in conjunction with a sensor 670 to use detections of the sensor 670 to guide the motion of the actuator 680 in a feedback loop.

In implementations, the computing device 600 may include a digitizer 690. In an implementation, the digitizer 690 is an element of a touch sensor. For example, the digitizer 690 may include a mesh of electrical traces or antennas formed within the structure of a touchscreen interface of the display 622. In resistive touchscreen technologies, the touch sensor or digitizer 690 is composed of the contact traces on the glass substrate that are connected to the upper conductive polyester layer under pressure. In capacitive touchscreen technologies, the touch sensor or digitizer 690 is composed of the conductive traces on the opposing surfaces forming the capacitive touch interface. In NFI touchscreen technologies, the touch sensor or digitizer 690 is composed of the conductive antenna traces. For the purposes of this disclosure, hereinafter, reference to a digitizer 690 is intended to include reference to the conductive traces in any of these touch sensor technologies, which may generate generally consistent electric fields across the surface of the corresponding touchscreen interface. In implementations, communication via the digitizer may include electrostatic or electromagnetic communication facilitated by detection or generation of changes in electric and/or magnetic fields generated by the digitizer 690. The changes in electric and/or magnetic fields may be measured and recognized as signals from an active stylus or another input device 634 (e.g., a peripheral input device).

In implementations, the digitizer 690 may be composed of a transparent protective cover layer as a top surface of a touchscreen interface (e.g., of the display 622) that is adhered to a transparent flexible substrate. An array of upper antenna traces may be formed on the bottom surface of the flexible substrate. The upper antenna traces may be made of a conductive transparent material, e.g., indium tin oxide, printed on the flexible substrate. The upper antenna traces may be generally parallel to each other and may be electrically coupled to one or more conductive plates along one or more edges of the touchscreen interface. Subsets of the upper antenna traces may be grouped into several different antenna sections, each electrically connected to a separate conductive plate along the edge of the touchscreen interface. An electrically insulating layer may be positioned beneath the upper antenna traces on the bottom surface of the flexible substrate. A glass layer may be positioned beneath the electrically insulating layer. An array of lower antenna traces may be formed on the top surface of the glass layer. The lower antenna traces may be made of a conductive transparent material, e.g., indium tin oxide, printed on the top surface of the glass layer. In an alternative embodiment, the lower antenna traces may be printed on a second transparent flexible substrate adhered to the top surface of the glass layer. The lower antenna traces may generally be parallel to each other and may be electrically coupled to one or more conductive plates along one or more edges of the touchscreen interface. The lower antenna traces may be oriented perpendicular to the direction of the upper antenna traces. Subsets of the lower antenna traces may be grouped into a number of different antenna sections, each corresponding to an opposing antenna section in the array of upper antenna traces. Each subset of the lower antenna traces may be electrically connected to a separate conductive plate along the edge of the touchscreen interface.

When an input device 643 (e.g., a peripheral input device) approaches or touches the display 622 with the digitizer 690, interference with an electric field generated by the capacitive interaction between the upper and lower antenna traces alters the voltage in the touch location. This voltage change in the touch location can be measured and localized by the perpendicular grid arrangement of the upper and lower antenna traces. Additional determinations such as hover height (i.e., when the peripheral input device is slightly above, but not touching, the display 622 or a trackpad with the digitizer 690) and inking (i.e., when the input device 634 is in contact with the display 622) can be made by processing software and circuitry depending upon the significance of change in the electric field detected by the digitizer 690.

In implementations, the computing device 600 includes a display generator for generating an image on the display 622 positioned beneath the glass layer. The display generator may be composed of a large array of pixels supported on a pixel substrate, e.g., an integrated circuit board providing addressable electronic connections to each of the pixels for control of the pixels. Each pixel may be composed of several photo-emitting elements, for example, red/green/blue light emitters that generate the display images and a photo-receiving element for receiving light input for other data and control purposes. As noted, each of the layers above the glass layer is transparent. Thus, the light forming the images generated by the pixels by the display generator passes through the digitizer 690, and thus the display images of the touchscreen interface are visible on the display 622. Several display and touchscreen processing components (e.g., processors, memory with software instructions, and/or circuits) may be positioned below the display generator and may be communicatively coupled to the display generator and the digitizer 690 to provide control of and send data to and receive data from each.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method for wireless uplink transmission from a computing device to a peripheral input device is provided. The method includes communicating over a wireless connection between a digitizer of the computing device and the peripheral input device by a multiuse communication protocol in which the digitizer is configured to receive input from the peripheral input device to affect operation of the computing device, transitioning communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and transmitting, while communicating by the dedicated uplink communication protocol, multiple consecutive data uplink blocks representing a cumulative upload from the digitizer to the peripheral input device before the digitizer accepts a downlink communication from the peripheral input device. Using a dedicated uplink communication protocol for uploads improves the speed by which an upload can be accomplished relative to a multiuse communication protocol.

Another example method of any preceding method is provided, the method including reverting communication by the digitizer over the wireless connection from the dedicated uplink communication protocol to the multiuse communication protocol based at least in part on satisfaction of an upload completion condition. Reverting to a multiuse communication protocol can save power relative to the dedicated uplink communication protocol and can allow for the peripheral input device to communicate with the computing device to affect the operation of the computing device.

Another example method of any preceding method is provided, wherein the upload completion condition is based at least in part on a confirmation by the peripheral input device that the cumulative upload is complete. Confirming that an upload is complete before reverting to a multiuse communication protocol can ensure that an upload is completed using the dedicated uplink communication protocol.

Another example method of any preceding method is provided, wherein the cumulative upload includes an update to firmware of the peripheral input device. Firmware updates can be sufficiently large such that relying on the few uplink windows within a multiuse communication protocol communication cycle is too slow and impractical.

Another example method of any preceding method is provided, wherein the operation of transmitting includes multicasting the multiple consecutive data uplink blocks to the peripheral input device and at least one other peripheral input device. Mutlicasting uploads simultaneously to multiple devices can provide a faster upload Another example method of any preceding method is provided, the method further including transmitting, by the digitizer to the peripheral input device, a signal indicating the dedicated uplink communication protocol is active, while communication is conducted by the dedicated uplink communication protocol.

Another example method of any preceding method is provided, wherein the digitizer is an element of one or more of a display and a trackpad communicatively coupled to the computing device.

Another example method of any preceding method is provided, wherein the peripheral input device is one or more of a digital pen and a remote controller.

An example system for wireless uplink transmission from a computing device to a peripheral input device is provided. The system includes one or more hardware processors configured to execute instructions from memory, a digitizer interface configured to communicate over a wireless connection between the computing device and the peripheral input device by a multiuse communication protocol in which the computing device is configured to receive user input from the peripheral input device via the digitizer interface to affect operation of the computing device, digitizer communication protocols executable by the one or more hardware processors and configured to transition communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and a digitizer to transmit via the digitizer interface, while communicating by the dedicated uplink communication protocol, multiple consecutive data uplink blocks representing a cumulative upload from the digitizer to the peripheral input device before the digitizer accepts a downlink communication from the peripheral input device.

Another example system of any preceding system is provided, wherein the digitizer communication protocols are further configured to revert communication over the wireless connection from the dedicated uplink communication protocol to the multiuse communication protocol based at least in part on satisfaction of an upload completion condition.

Another example system of any preceding system is provided, wherein the upload completion condition is based at least in part on a confirmation by the peripheral input device that the cumulative upload is complete.

Another example system of any preceding system is provided wherein the cumulative upload includes an update to firmware of the peripheral input device.

Another example system of any preceding system is provided, wherein the digitizer is further configured to transmit to the peripheral input device a signal indicating the dedicated uplink communication protocol is active while the communication is conducted by the dedicated uplink communication protocol.

Another example system of any preceding system is provided, wherein the digitizer is an element of one or more of a display and a trackpad communicatively coupled to the computing device.

One or more example tangible processor-readable storage media embodied with instructions for executing on one or more processors and circuits of a computing device a process for wireless uplink transmission from the computing device to a peripheral input device is provided. The process includes communicating over a wireless connection between a digitizer of the computing device and the peripheral input device by a multiuse communication protocol in which the digitizer is configured to receive user input from the peripheral input device to affect operation of the computing device, transitioning communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and transmitting, while communicating by the dedicated uplink communication protocol, multiple consecutive data uplink blocks representing a cumulative upload from the digitizer to the peripheral input device before the digitizer accepts a downlink communication from the peripheral input device.

One or more other example tangible processor-readable storage media of any preceding media is provided, the process further including reverting communication by the digitizer over the wireless connection from the dedicated uplink communication protocol to the multiuse communication protocol based at least in part on satisfaction of an upload completion condition.

One or more other example tangible processor-readable storage media of any preceding media is provided, wherein the upload completion condition is based at least in part on a confirmation by the peripheral input device that the cumulative upload is complete.

One or more other example tangible processor-readable storage media of any preceding media is provided, wherein the cumulative upload includes an update to firmware of the peripheral input device.

One or more other example tangible processor-readable storage media of any preceding media is provided, wherein the operation of transmitting includes multicasting the multiple consecutive data uplink blocks to the peripheral input device and at least one other peripheral input device.

One or more other example tangible processor-readable storage media of any preceding media is provided, wherein the digitizer is an element of one or more of a display and a trackpad communicatively coupled to the computing device.

An example system for wireless uplink transmission from a computing device to a peripheral input device is provided. The system includes means for communicating over a wireless connection between a digitizer of the computing device and the peripheral input device by a multiuse communication protocol in which the digitizer is configured to receive input from the peripheral input device to affect operation of the computing device, means for transitioning communication by the digitizer over the wireless connection from the multiuse communication protocol to a dedicated uplink communication protocol in which communication between the computing device and the peripheral input device includes transmission of multiple consecutive uplink blocks from the digitizer to the peripheral input device before the digitizer accepts downlink communications from the peripheral input device, and means for transmitting, while communicating by the dedicated uplink communication protocol, multiple consecutive data uplink blocks representing a cumulative upload from the digitizer to the peripheral input device before the digitizer accepts a downlink communication from the peripheral input device.

Another example system of any preceding system is provided, the system further including means for reverting communication by the digitizer over the wireless connection from the dedicated uplink communication protocol to the multiuse communication protocol based at least in part on satisfaction of an upload completion condition.

Another example system of any preceding system is provided, wherein the upload completion condition is based at least in part on a confirmation by the peripheral input device that the cumulative upload is complete.

Another example system of any preceding system is provided, wherein the cumulative upload includes an update to firmware of the peripheral input device.

Another example system of any preceding system is provided, wherein the means for transmitting includes means for multicasting the multiple consecutive data uplink blocks to the peripheral input device and at least one other peripheral input device.

Another example system of any preceding system is provided, the system further including means for transmitting, by the digitizer to the peripheral input device, a signal indicating the dedicated uplink communication protocol is active, while communication is conducted by the dedicated uplink communication protocol.

Another example system of any preceding system is provided, wherein the digitizer is an element of one or more of a display and a trackpad communicatively coupled to the computing device.

Another example system of any preceding system is provided, wherein the peripheral input device is one or more of a digital pen and a remote controller.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric relative to the quantitative or qualitative feature described. For example, a term of relative degree applied to orthogonality suggests an angle may have a magnitude of variability relative to a right angle. When values are presented herein for particular features and/or a magnitude of variability, ranges above, ranges below, and ranges between the values are contemplated.

What is claimed is:

1. A method for wireless uplink transmission from a computing device to a peripheral input device, comprising:
   communicating over a wireless connection between a digitizer of the computing device and the peripheral input device by a multiuse communication protocol in which the digitizer is configured to receive downlink communications from the peripheral input device to affect operation of the computing device and to transmit uplink communications to the peripheral input device;
   issuing a request to the peripheral input device to accept a data upload of a predetermined minimum number of consecutive uplink blocks in a dedicated uplink communication protocol in which the digitizer does not accept downlink communications from the peripheral input device before the predetermined minimum number of consecutive uplink blocks is transmitted to the peripheral input device;
   transitioning communication by the digitizer over the wireless connection from the multiuse communication protocol to the dedicated uplink communication protocol in which communication between the computing device and the peripheral input device includes transmission of the predetermined minimum number of consecutive uplink blocks from the digitizer to the peripheral input device before the digitizer accepts downlink communications from the peripheral input device;
   transmitting, using the dedicated uplink communication protocol over the wireless connection between the digitizer and the peripheral input device, the predetermined minimum number of consecutive data uplink blocks representing a cumulative upload from the digitizer to the peripheral input device, wherein the digitizer does not accept downlink communications from the peripheral input device while transmitting the predetermined minimum number of consecutive data uplink blocks; and
   indicating to the peripheral input device to transition back to the multiuse communication protocol after transmission of the predetermined minimum number of consecutive uplink blocks is completed.

2. The method of claim 1, further comprising:
   reverting communication by the digitizer over the wireless connection from the dedicated uplink communication protocol to the multiuse communication protocol based at least in part on satisfaction of an upload completion condition.

3. The method of claim 2, wherein the upload completion condition is based at least in part on a confirmation by the peripheral input device that the cumulative upload is complete.

4. The method of claim 1, wherein the cumulative upload includes an update to firmware of the peripheral input device.

5. The method of claim 1, wherein the operation of transmitting includes:
   multicasting the predetermined minimum number of consecutive data uplink blocks to the peripheral input device and at least one other peripheral input device.

6. The method of claim 1, wherein the digitizer is an element of one or more of a display and a trackpad communicatively coupled to the computing device.

7. The method of claim 1, wherein the peripheral input device is one or more of a digital pen and a remote controller.

8. The method of claim 1, wherein the downlink communications include at least one of a progress update regarding the cumulative upload, a peripheral input, and a status of the peripheral input device.

9. A system for wireless uplink transmission from a computing device to a peripheral input device, comprising:
   one or more hardware processors configured to execute instructions from memory;
   a digitizer interface configured to communicate over a wireless connection between the computing device and the peripheral input device by a multiuse communication protocol in which the computing device is configured to receive downlink communications from the peripheral input device to affect operation of the computing device;
   digitizer communication protocols executable by the one or more hardware processors and configured to transition communication by the digitizer over the wireless connection from the multiuse communication protocol to a dedicated uplink communication protocol in which communication between the computing device and the peripheral input device includes transmission of a predetermined minimum number of consecutive uplink blocks from the digitizer to the peripheral input device before the digitizer accepts downlink communications from the peripheral input device; and
   a digitizer configured to:
      transmit a request to the peripheral input device to accept a data upload of the predetermined minimum number of consecutive uplink blocks in the dedicated uplink communication protocol in which the digitizer does not accept downlink communications from the peripheral input device before the predetermined minimum number of consecutive uplink blocks is transmitted to the peripheral input device;
      transmit via the digitizer interface, using the dedicated uplink communication protocol over the wireless connection between the digitizer and the peripheral input device, the predetermined minimum number of consecutive data uplink blocks representing a cumulative upload from the digitizer to the peripheral input device, wherein the digitizer does not accept downlink communications from the peripheral input device while transmitting the predetermined minimum number of consecutive data uplink blocks; and
      indicate to the peripheral input device to transition back to the multiuse communication protocol after transmission of the predetermined minimum number of consecutive uplink blocks is completed.

10. The system of claim 9, the digitizer communication protocols further configured to:
   revert communication over the wireless connection from the dedicated uplink communication protocol to the multiuse communication protocol based at least in part on satisfaction of an upload completion condition.

11. The system of claim 10, wherein the upload completion condition is based at least in part on a confirmation by the peripheral input device that the cumulative upload is complete.

12. The system of claim 9, wherein the cumulative upload includes an update to firmware of the peripheral input device.

13. The system of claim 9, wherein the digitizer is an element of one or more of a display and a trackpad communicatively coupled to the computing device.

14. One or more tangible processor-readable storage media embodied with instructions for executing on one or more processors and circuits of a computing device a process for wireless uplink transmission from the computing device to a peripheral input device, the process comprising:

communicating over a wireless connection between a digitizer of the computing device and the peripheral input device by a multiuse communication protocol in which the digitizer is configured to receive downlink communications from the peripheral input device to affect operation of the computing device;

issuing a request to the peripheral input device to accept a data upload of a predetermined minimum number of consecutive uplink blocks in a dedicated uplink communication protocol in which the digitizer does not accept downlink communications from the peripheral input device before the predetermined minimum number of consecutive uplink blocks is transmitted to the peripheral input device;

transitioning communication by the digitizer over the wireless connection from the multiuse communication protocol to the dedicated uplink communication protocol in which communication between the computing device and the peripheral input device includes transmission of the predetermined minimum number of consecutive uplink blocks from the digitizer to the peripheral input device before the digitizer accepts downlink communications from the peripheral input device;

transmitting, using the dedicated uplink communication protocol over the wireless connection between the digitizer and the peripheral input device, the predetermined minimum number of the consecutive data uplink blocks representing a cumulative upload from the digitizer to the peripheral input device, wherein the digitizer does not accept downlink communications from the peripheral input device while transmitting the predetermined minimum number of consecutive data uplink blocks; and indicating to the peripheral input device to transition back to the multiuse communication protocol after transmission of the predetermined minimum number of consecutive uplink blocks is completed.

15. The one or more tangible processor-readable storage media of claim 14, the process further comprising:

reverting communication by the digitizer over the wireless connection from the dedicated uplink communication protocol to the multiuse communication protocol based at least in part on satisfaction of an upload completion condition.

16. The one or more tangible processor-readable storage media of claim 15, wherein the upload completion condition is based at least in part on a confirmation by the peripheral input device that the cumulative upload is complete.

17. The one or more tangible processor-readable storage media of claim 14, wherein the cumulative upload includes an update to firmware of the peripheral input device.

18. The one or more tangible processor-readable storage media of claim 14, wherein the operation of transmitting includes:

multicasting the predetermined minimum number of consecutive data uplink blocks to the peripheral input device and at least one other peripheral input device.

19. The one or more tangible processor-readable storage media of claim 14, wherein the digitizer is an element of one or more of a display and a trackpad communicatively coupled to the computing device.

* * * * *